Jan. 15, 1963  E. STUMP  3,073,616
STEERING ARRANGEMENT FOR AUTOMOTIVE VEHICLES
Original Filed May 26, 1955  2 Sheets-Sheet 1
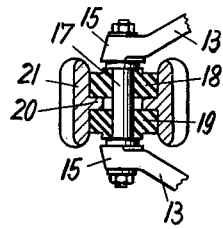
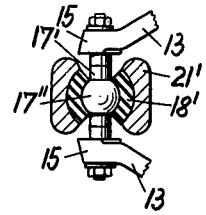
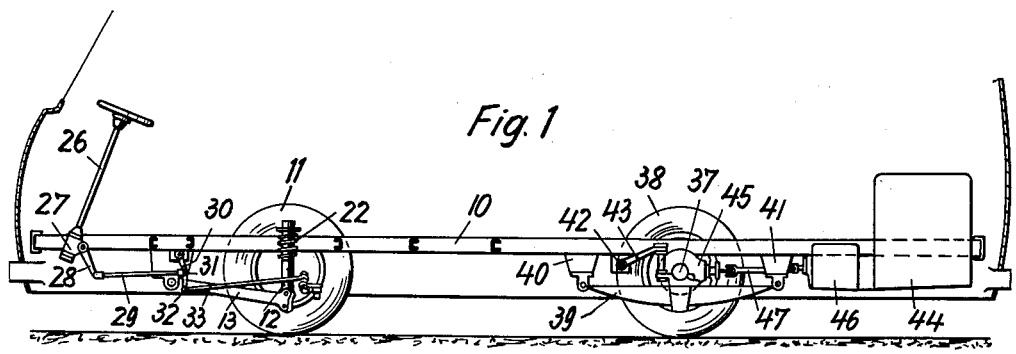
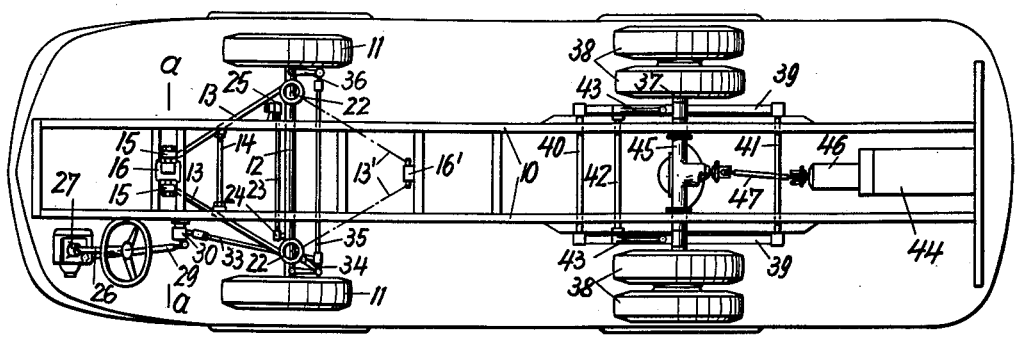
INVENTOR
EUGEN STUMP
BY *Dicke and Craig*
ATTORNEYS.

Jan. 15, 1963   E. STUMP   3,073,616
STEERING ARRANGEMENT FOR AUTOMOTIVE VEHICLES
Original Filed May 26, 1955   2 Sheets-Sheet 2

INVENTOR
EUGEN STUMP
BY Dicke and Craig
ATTORNEYS.

United States Patent Office 3,073,616
Patented Jan. 15, 1963

3,073,616
STEERING ARRANGEMENT FOR AUTOMOTIVE VEHICLES
Eugen Stump, Stuttgart-Unterturkheim, Germany, assignor to Daimler-Benz Aktiengesellschaft, Stuttgart-Unterturkheim, Germany
Original application May 26, 1955, Ser. No. 511,299. Divided and this application Feb. 12, 1959, Ser. No. 796,721
Claims priority, application Germany Dec. 6, 1954
4 Claims. (Cl. 280—95)

This application is a division of applicant's prior application Serial No. 511,299, filed May 26, 1955, entitled "Axle Suspension for Motor Vehicles" and since abandoned.

This invention relates to a motor vehicle and more particularly to a motorbus with rear-engine drive.

One object of the present invention is the provision of a motorbus construction which is distinguished for its optimum riding qualities as well as its especially advantageous taking up of the forces acting on the road wheels, in that the axle constructions are significantly adapted to the differences in load on the front and rear axles.

Another object of the present invention is to provide an especially soft and flexible springing for the front wheels carrying a lighter load and a stiffer springing for the rear wheels.

An essential feature of the present invention consists accordingly therein of a rigid front axle, preferably suspended on as wide a base as possible by means of coil springs or similar non-guiding springs, is in known manner flexibly mounted for universal movement by a push bracing as well as for taking up the transverse forces by a discrete transverse support means, for example, a transverse swinging arm. On the other hand, the rigid rear axle is in known manner guided and suspended on the vehicle frame by longitudinally extending leaf springs. In conjunction with this the front axle may be formed as draw axle or as push axle, whilst the rear axle is preferably provided with a stabilizer of known construction.

Owing to the lighter load on the front wheels, above all in the employment of a rear engine, which relieves the front axle spatially of the weight of the driving engine as well as of direct effect of the driving forces, a light, strut-braced axle may be particularly advantageously employed in connection with frictionless coil springs which are especially useful for obtaining a soft, flexible springing. In this connection it is to be noted that the arrangement of a push bracing has no prejudicial effect whatsoever. On the other hand, by the employment of a rigid axle, the center of motion of the transverse vibrations of the vehicle body in the curve lies relatively high, so that a stabilizer is not necessary on the front axle.

In using a draw axle, the axle will be in a firm position in regard to forces acting on the road wheels from the front in direction of travel of the vehicle. The push axle, on the other hand, results in an advantageous transmission of the forces to the vehicle frame.

In contrast to the front axle, the driven rear axle is advantageously suspended on the vehicle frame by leaf springs, as accommodation of a bracing is spatially disadvantageous, above all when the vehicle is driven by a rear engine. Also, the larger forces would require relatively heavy constructions for the bracing. The leaf springs effect at the same time both the guiding and springing of the road wheels, the self-damping of the springs being especially suitable because of the heavy loading of the axle by the driving forces and the weight. Even if the instantaneous center in lateral inclinations of the vehicle body lies at the same level as the axle suspension, it is in this case nevertheless appropriate to use a stabilizer in addition to the springs in order to obtain an increased counteracting force against lateral inclinations of the vehicle body in the presence of the especially strong lateral forces on the rear axle.

According to another feature of the present invention, the joints, in particular those for supporting the front axle on the vehicle frame, are formed as rubber joints. Transmission of noises is thus avoided and the joints require neither servicing nor lubrication.

The present invention also relates to a steering device for motor vehicles in particular for heavy motor vehicles such as motorbuses, or the like, having a push bracing for supporting the axle on the vehicle frame and a steering gear arranged displaced in relation to the vertical transverse plane extending through the point of support of the push bracing.

One of the objects of the present invention in this conjunction is to overcome the difficulty existing in such steering arrangements, namely, elimination of interference with the steering motions of the wheels by their up and down motions and assuring most accurate steering kinematics.

A further object of the present invention is to provide a most advantageous placement of the steering linkages on the motor vehicle.

A feature of the present invention consists accordingly essentially therein that the steering gear by means of a linkage actuates an intermediate lever located approximately in the vertical transverse plane extending through the point of support of the push bracing and which on its part is connected by means of a linkage, performing essentially the same swinging motions as the push bracing, to a steering lever arranged on the front axle. Differences in motion between the front axle and the steering linkage which could affect the steering position of the front wheels are thereby avoided. Such a steering arrangement is distinguished for its complete elimination of shimmy.

In a preferred embodiment of the present invention, the steering gear is arranged at the front end of the vehicle, whilst the push bracing adapted for supporting the front axle is linked to the vehicle frame in front of the front axle and between the latter and the front end of the vehicle. With this arrangement the driver's seat or driver's cab may be located directly at the front end of the vehicle and the entire space in the rear of the front axle is available as useful space unhindered by axle bracing and steering gear.

According to another feature of the present invention the intermediate lever arranged on the vehicle superstructure approximately in the plane of the linking of the push bracing, is mounted with its fulcrum in vertical direction. The steering linkage can thus be located at the same elevation on the vehicle and requires but little space.

An embodiment of the invention, as applied to a motorbus, is illustrated by way of example in the accompanying diagrammatic drawings, in which:

FIG. 1 is a side elevational view of the chassis,

FIG. 2 is a top plan view of the same,

FIGS. 3 and 4 are fragmentary, partly sectional views through the linking arrangements of the forward axle bracing on the vehicle frame in two forms of construction.

Figure 5:
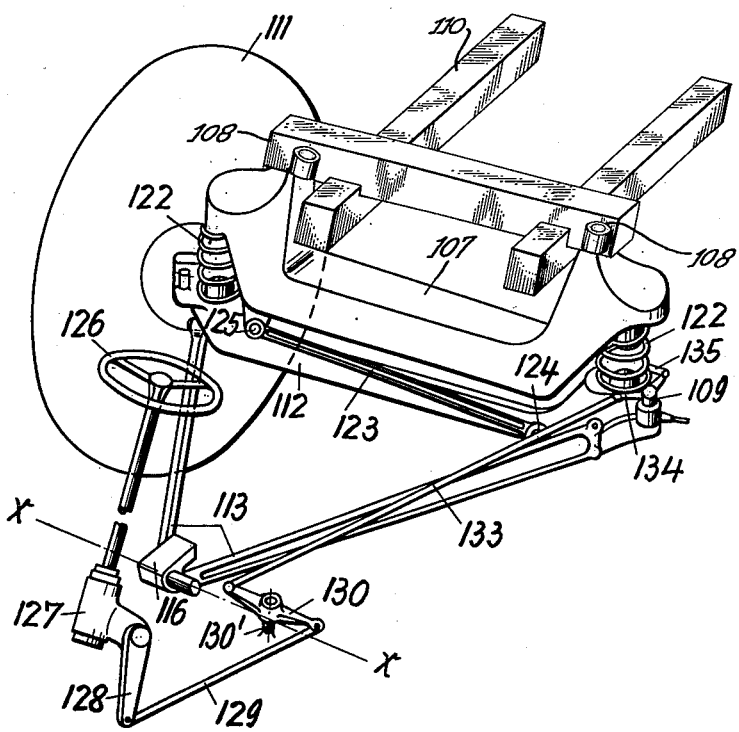
FIG. 5 is a perspective view of another form of construction of the steering device.

Referring to FIG. 1, the numeral 10 represents the vehicle frame which is composed of two through-going side members ruggedly braced and connected together by cross members. The side members as well as the cross members are preferably box-section throughout, thereby giving greater strength with lighter weight. The front wheels 11 are supported on a rigid axle 12 which is ruggedly braced by two diagonal struts 13 welded rigidly thereto. The diagonal struts 13, which are braced by a cross member 14, are provided with bearing eyes 15 at their front end and are connected to the vehicle frame 10 by a universal joint 16. In the embodiment according to FIG. 3, the latter comprises a bolt 17 connecting the bearings eyes 15 and supported in rubber members 18, 19 which are held axially between the bearing eyes 15 of the strut members 13 and abut against a central shoulder 20 of the joint member 21 secured to the vehicle frame.

In the embodiment according to FIG. 4 a bolt 17', having a ball portion 17" which is embedded in a rubber member 18' arranged in the joint member 21', is provided for connecting the bearing eyes 15 of the strut braces 13.

A vertical coil spring 22 is mounted at each side between the front axle 12 and the vehicle frame 10. Since the coil springs are incapable of taking up lateral forces, a transverse swinging arm 23, which is linked to the front axle 12 at 24 and to the vehicle frame 10 at 25, is provided for taking up the lateral forces. These joints may also be provided with rubber inserts so that any metallic connection between the parts to be linked is avoided.

The steering-wheel shaft 26 serves for steering the front wheels, its rotary motion is transmitted through the steering gear 27, steering-gear arm 28 and steering-gear connecting rod 29 to an intermediate lever 30 mounted on a transverse axis of the vehicle, the steering-gear connecting rod 29 being linked to the lever 30 by a joint 31. The motion of the upwardly directed steering rod 33 is stepped up by another joint 32 linked to a lever arm larger than that of the joint 31 on the lever 30. The steering rod 33 is linked to the steering knuckle 34 of the left-hand front wheel 11 which is in known manner connected with the steering knuckle 36 of the right-hand front wheel by the steering-knuckle tie rod 35. The steering gear connecting rod 29 is connected to the steering gear connecting rod 33 in such a manner as to provide rod 29 with a shorter lever arm than rod 33. As clearly shown in FIGS. 1 and 2 the lever 30 is linked to the frame 10 approximately in the axis of rotation a—a of the push-bracing 13. The lever 30 is linked to the frame approximately at a distance corresponding to the length of the steering-knuckle arm 34 to the rear of the vertical transverse plane containing the axis a—a, so that the length of the steering rod 33 corresponds to that of the push bracing or strut braces 13 (as seen in side elevation) and consequently executes essentially the same swinging motions as the push bracing or strut braces 13 when the front axle is swung about the joint 16.

The rear axle 37 carrying, for example, wheels 38 with dual tires is supported on the frame 10 by leaf springs 39 which are in known manner shackled to cross members 40 and 41 of the frame. A stabilizer 42 mounted by rods 43 and interposed rubber cushions on the axle 37 is provided for increasing the stability on curves.

The rear wheels 38 are driven from a rear engine 44 which drives the rear axle drive gearing 45 via a change-speed gear 46 and a Cardan shaft 47.

In FIG. 5 is shown a further embodiment of the invention in perspective view. The front wheels 111 are carried by an axle 112 by means of steering knuckles 109. Coil springs 122, by way of example, are mounted between a cross member 107 and the axle 112, and the latter is, as to the cross member, transversely braced by a strut 123 linked at 124 to the axle and at 125 to the cross member. At the points 108 the cross member 107 is mounted, for example, with rubber buffers interposed, on the superstructure of the vehicle as, for example, a main frame or a self-supporting vehicle body, such that the cross member 107 together with the axle 112, wheels 111 and springs 122 can be removed as an entirety from the frame and vehicle body respectively.

The axle 112 is supported in direction of travel of the vehicle by a push bracing 113, by way of example, with interposed rubber buffers permitting universal flexibility, on a bracket 116 attached to the vehicle frame, so that the axle 112 may swing about the transverse avis x—x on the up and down motions of the road wheels.

The vehicle is steered by the steering wheel 126 which transmits the steering motion through the steering gear 127 to the steering-gear arm 128 which is connected by the steering-gear connecting rod 129 to the intermediate lever 130 which with vertical axis 130' is mounted on the frame or on the vehicle body, or on another part connected to the frame and vehicle body respectively.

The axis of rotation 130' of the two-armed intermediate lever 130 is arranged approximately in the particular vertical transverse plane which contains also the axis of rotation x—x for the push bracing 113. The opposite arm of the intermediate lever 130 is linked by a further steering-gear connecting rod 133 to the steering-gear arm 134 which is connected with the steering knuckle 109 of the end.

A steering-knuckle tie rod 135 connects the steering-knuckle arms of the two opposite wheels with one another. As clearly shown in FIGURE 5, the lever 130 is linked to the frame approximately in the axis of rotation x—x at the push bracing 113. Lever 130 is linked to the frame approximately at a distance corresponding to a length of the steering-gear arm 134 to the rear of the vertical transverse plane containing the axis x—x, so that the length of the steering rod 133 corresponds to that of the push bracing or strut braces 113. Consequently, the steering rod 133 executes essentially the same swinging motions as the push bracing 113 when the front axle is swung about the joint 116. In the up and down motions of the axle 112 about the horizontal axis x—x, the steering-gear connecting rod 133 executes a swinging motion which corresponds essentially to that of the push bracing 113, so that also in this instance it is avoided that the steering is prejudically affected by the up and down motions of the road wheels.

It will be obvious that the details of construction may be varied from those shown in the drawings, I therefore do not limit myself to such details.

What I claim is:

1. In a motor vehicle of the class described, a vehicle superstructure, a vehicle frame for supporting said superstructure, a wheel axle, means for mounting said frame on said axle, a pair of road wheels supported on said axle and arranged opposite to each other on different sides of the vehicle, means for steerably connecting each said road wheel with said axle such that each of said road wheels may turn about a vertical axis with respect to said axle, a push bracing rigidly connected at one end with said axle and extending in the longitudinal direction of the vehicle, means for flexibly connecting the other end of said push bracing to said vehicle frame in a first vertical transverse plane of the vehicle for pivoting about a transverse axis lying in said plane, a steering device on said vehicle superstructure having a steering gear arranged in a second vertical transverse plane located at a distance in the longitudinal direction of said vehicle from said first transverse plane, a first steering lever mounted on said steering gear, a second steering lever pivotally mounted on said vehicle frame for pivotal movement about an axis arranged approximately in said first transverse plane, a longitudinally extending steering gear connecting rod, first and second connections for connecting said connecting rod, respectively, to said first steering lever and to said second steering lever for transferring movements of one to the other, a third and turnable steering lever arranged on one of said means for steerably connecting said road wheels with said axle for rotary movement therewith about said vertical axis, a second longitudinally extending steering gear connecting rod, third and fourth connections for flexibly connecting said second connecting rod, respectively, to said second steering lever and to said third steering lever, said last-mentioned connecting rod extending generally in the longitudinal direction of the vehicle and executing through said flexible connection essentially the same swinging motions as the push bracing when the axle experiences up-and-down movement, and a steering tie rod connecting said two wheels, and said second and fourth connections being arranged at approximately the same level with respect to said frame and below the centers of said wheels and said vehicle frame.

2. A motor vehicle as defined in claim 1, wherein the axis about which said second steering lever pivots extends essentially transversely of the vehicle.

3. The combination according to claim 1, wherein said second transverse plane with the steering gear is arranged at the front end of the vehicle and said first transverse plane is located between said wheel axle and said second transverse plane.

4. The combination according to claim 1 with means for mounting said second steering lever on said vehicle superstructure such that it is turnable about an essentially vertical axis of rotation.

References Cited in the file of this patent

UNITED STATES PATENTS

| | | |
|---|---|---|
| 1,348,512 | Mills | Aug. 3, 1920 |
| 1,564,090 | Meiklejohn | Dec. 1, 1925 |
| 2,180,917 | Terrell | Nov. 21, 1939 |
| 2,638,355 | Spangler | May 12, 1953 |
| 2,692,778 | Stump | Oct. 26, 1954 |

FOREIGN PATENTS

| | | |
|---|---|---|
| 900,786 | Germany | Jan. 4, 1954 |
| 45,524 | Sweden | June 11, 1919 |
| 197,143 | Switzerland | July 16, 1938 |